United States Patent [19]
Abert et al.

[11] Patent Number: 5,604,872
[45] Date of Patent: Feb. 18, 1997

[54] STORED-PROGRAM CONTROLLER WITH MEANS FOR CONNECTING MULTIPLE PLUG-IN FUNCTIONAL UNITS TO A CORRESPONDING ARRAY OF PLUG-IN POSITIONS CONNECTED TOGETHER BY MULTIPLE ADDRESS LINES

[75] Inventors: Michael Abert, Au; Siegfried Block, Kandel; Johannes Bozenhardt; Franz Leigsnering, both of Ettlingen; Werner Pfatteicher, Pfinztal; Franz-Clemens Schewe, Karlsruhe, all of Germany

[73] Assignee: Siemens Aktiengesellschaft, Munich, Germany

[21] Appl. No.: 436,249

[22] PCT Filed: Nov. 18, 1993

[86] PCT No.: PCT/DE93/01097

§ 371 Date: May 17, 1995

§ 102(e) Date: May 17, 1995

[87] PCT Pub. No.: WO94/11827

PCT Pub. Date: May 26, 1994

[30] Foreign Application Priority Data

Nov. 19, 1992 [DE] Germany .......................... 42 39 030.3

[51] Int. Cl.⁶ .............................. G06F 12/06; G06F 9/06; G06F 1/16
[52] U.S. Cl. ............................................ 395/282; 395/281
[58] Field of Search ..................................... 395/281, 282, 395/822, 823; 361/683, 686, 684

[56] References Cited

U.S. PATENT DOCUMENTS

| | | | |
|---|---|---|---|
| 4,050,098 | 9/1977 | Seipp | 364/900 |
| 4,275,455 | 6/1981 | Bartlett | 395/750 |
| 4,442,504 | 4/1984 | Dummermuth et al. | 395/737 |
| 5,038,317 | 8/1991 | Callan et al. | 395/282 |
| 5,129,069 | 7/1992 | Helm et al. | 395/400 |
| 5,202,965 | 4/1993 | Ahn et al. | 395/283 |
| 5,278,730 | 1/1994 | Kikinis | 361/686 |
| 5,311,397 | 5/1994 | Harshberger et al. | 361/683 |
| 5,386,567 | 1/1995 | Lien et al. | 395/700 |
| 5,450,552 | 9/1995 | Michino | 395/281 |

FOREIGN PATENT DOCUMENTS

0486818  5/1992  European Pat. Off. ........ G06F 12/06

*Primary Examiner*—Gopal C. Ray
*Attorney, Agent, or Firm*—Kenyon & Kenyon

[57] ABSTRACT

An arrangement with a plurality of plug points which are interconnected via a system bus having data and control lines, address lines taken to connections of the plug points, one of which is connected to a selector terminal, and plug-in functional units, at least one of which has contacts for connecting the address lines to this unit and each of the remaining functional units has contacts for connecting the unit to the selector terminal of the plug point. Units performing read and write functions can be fitted at any plug point in such an arrangement. The invention is applicable in store-programmable controls.

5 Claims, 1 Drawing Sheet

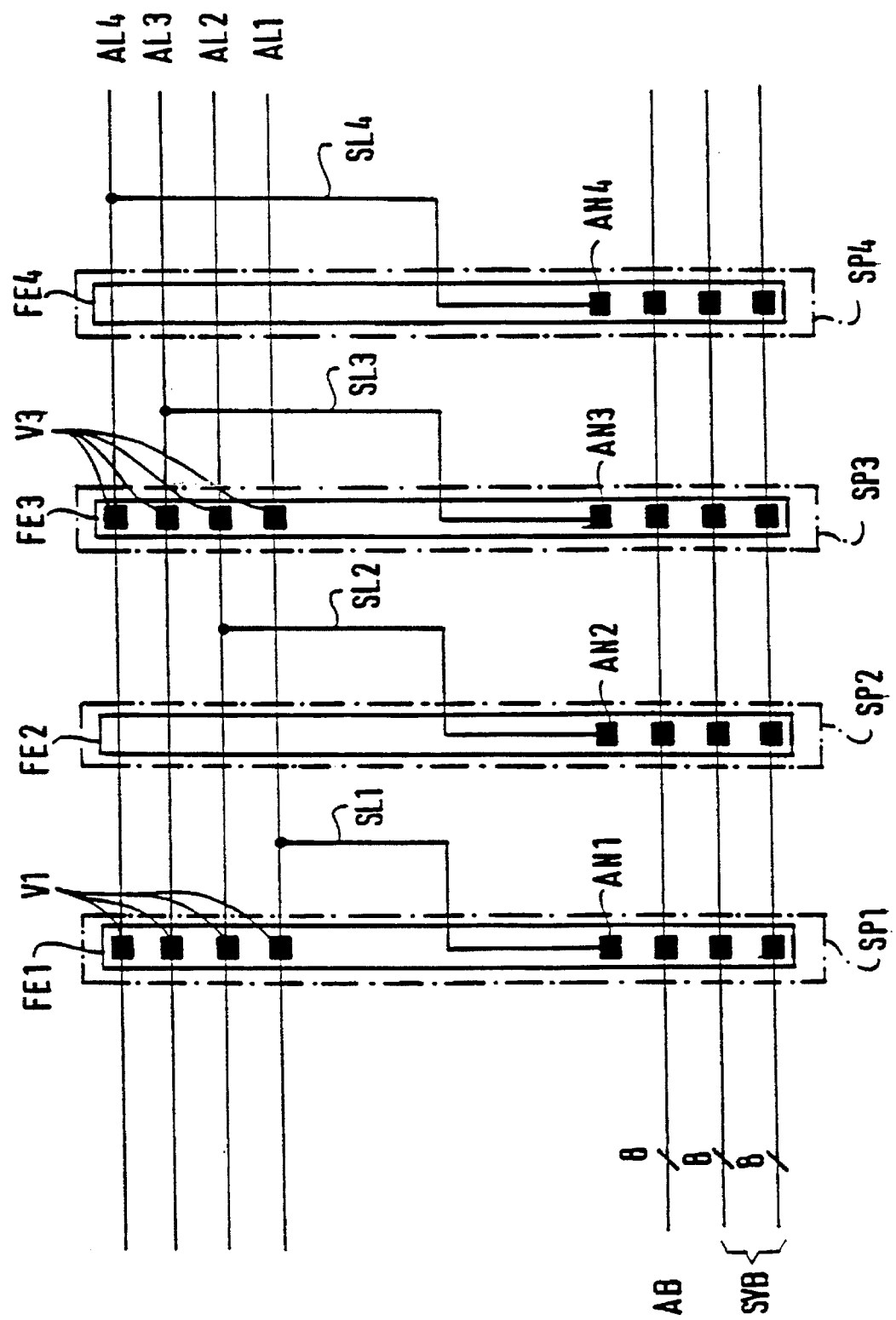

STORED-PROGRAM CONTROLLER WITH MEANS FOR CONNECTING MULTIPLE PLUG-IN FUNCTIONAL UNITS TO A CORRESPONDING ARRAY OF PLUG-IN POSITIONS CONNECTED TOGETHER BY MULTIPLE ADDRESS LINES

BACKGROUND OF THE INVENTION

The present invention concerns an arrangement with a plurality of plug points and a plurality of plug-in functional units.

In stored-program controls, generally one or more central subassemblies and a plurality of functional subassemblies, for example subassemblies for digital or analog input and output of signals, are interconnected via a system bus having address, data, and control lines. The subassemblies are fitted into plug points of a central or expansion unit, and means for address coding and decoding are provided in order for the functional subassemblies to be addressed by the central subassemblies during read or write functions.

To allow address coding to be dispensed with, it is proposed in European Patent Application 0 486 818 to provide one line each between a control unit and individual modules of a control system. The control unit addresses the modules by transmitting different data words over these lines. An addressing system of this kind, in an arrangement with plug-in functional units, means that a special plug-in position which executes read and write accesses to other functional units must be provided for the functional unit.

SUMMARY OF THE INVENTION

The present invention provides an arrangement of the aforesaid kind in which a functional unit executing read and write accesses can be fitted into any plug point.

In accordance with the present invention such an arrangement includes a plurality of plug points that are interconnected via a system bus having data and control lines; address lines taken to connections of the plug points, one of which is connected respectively to a selector terminal of a plug point; and plug-in functional units, at least one of which has means for connecting the address lines to this unit, and each of the remaining functional units has means for connecting the unit to the selector terminal of the plug point.

In an embodiment of the invention, in order to transfer subaddresses the plug-in positions are interconnected via an address bus. As a result, for example, different memory regions of the functional units are addressable.

The arrangement according to the present invention is used in particular in a stored-program control, preferably in a stored-program control with a central unit and at least one expansion unit, which are interconnected via a connecting cable which has the system and address bus, the address lines, and further address lines for addressing the expansion unit.

BRIEF DESCRIPTION OF THE DRAWING

The invention and its embodiments and advantages will be explained further with reference to the drawing, in which an exemplary embodiment of the invention is illustrated.

The FIGURE shows a schematic circuit diagram of an arrangement with plug points.

DETAILED DESCRIPTION

SP1–SP4 designate plug-in positions which are interconnected via a system bus SYB having eight data lines and eight control lines. Address lines AL1–AL4 are taken from plug-in position to plug-in position at connecting means of these plug-in positions, of which first address line AL1 is connected, via a line SL1, to a selector terminal AN1 of plug-in position SP1. Address lines AL2, AL3, and AL4 are correspondingly connected via lines SL2, SL3, and SL4 to selector terminals AN2, AN3, and AN4 of plug-in positions SP2, SP3, and SP4. Functional units FE1–FE4 can be fitted arbitrarily into plug points SP1, . . . , for which purpose functional units executing read and write functions must be connectable to all address lines AL1–AL4 in order to address the remaining functional units. In the present example, functional units FE1, FE3 access units FE2, FE4 for read or write purposes. For this purpose, functional units FE1 and FE3 have means, for example in the form of blade or spring contacts, of making a connection V1, V3 to the connection means of the plug points and thus to address lines AL1–AL4. The addressable functional units FE2 and FE4 also have means in the form of a spring or blade contact, by means of which selector terminal AN2, AN4 of plug points SP2, SP4 makes contact with functional units FE2, FE4. Functional units FE1, FE3 address functional units FE2, FE4 with a signal, for example a logical "1," via address lines AL2, AL4 and selector terminals AN2, AN4. Functional units FE1, FE3 can address one another via lines AL1, AL3 and selector terminals AN1, AN3.

To allow different regions of a functional unit FE1, . . . to be addressed, an address bus AB is provided, which in the present case has eight address lines and interconnects plug-in positions SP1, . . . SP4. With this 8-bit wide address bus, accesses are possible to 256 different regions of a functional unit addressed via address lines AL1, . . . . . AL4.

What is claimed is:

1. A system comprising:
    a plurality of plug-in positions each having connection means and a selector terminal;
    a system bus having data and control lines interconnecting said plurality of plug-in positions;
    address lines coupled to the connection means of the plug-in positions, each is additionally connected, via a corresponding line, to the selector terminal of a corresponding plug-in position; and
    a plurality of plug-in functional units, at least one of which has means for connecting the address lines to this unit, and each of the remaining functional units having means for connecting that unit to the selector terminal of the corresponding plug-in position;
    wherein at least one of the plug-in functional units that are connected to the address lines is a functional unit capable of executing read and write operations.

2. The system of claim 1, wherein to transfer subaddresses, the plug-in positions are interconnected via an address bus.

3. A store-programmable control with a central unit having in each case an arrangement according to claim 2, and at least one expansion unit, which are interconnected via a connecting cable which has the system and address bus, the address lines and further address lines for addressing the expansion unit.

4. A store-programmable control including a system comprising:
    a plurality of plug-in positions each having connection means and a selector terminal;

a system bus having data and control lines interconnecting said plurality of plug-in positions;

address lines coupled to the connection means of the plug-in positions, each is additionally connected, via a corresponding line, to the selector terminal of a corresponding plug-in position; and a plurality of plug-in functional units, at least one of which has means for connecting the address lines to this unit, and each of the remaining functional units having means for connecting that unit to the selector terminal of the corresponding plug-in position;

wherein at least one of the plug-in functional units that are connected to the address lines is a functional unit capable of executing read and write operations.

5. A functional unit capable of performing read and write functions, comprising:

first connecting means for connecting said functional unit to at least one of a plurality of plug-in positions, each of said plurality of plug-in positions including connection means and a selector terminal, said plurality of plug-in positions being interconnected via an address bus and a system bus having data lines and control lines, said plurality of plug-in positions being further interconnected via a plurality of address lines, each said address line being connected via a corresponding connection line to the selector terminal of a corresponding plug-in position; and second connecting means for connecting said functional unit to one selector terminal of one of said plurality of plug-in positions, wherein said first connection means connects via said address lines one of said plurality of plug-in positions to said functional unit capable of performing read and write functions.

* * * * *